United States Patent Office 3,079,809
Patented Mar. 5, 1963

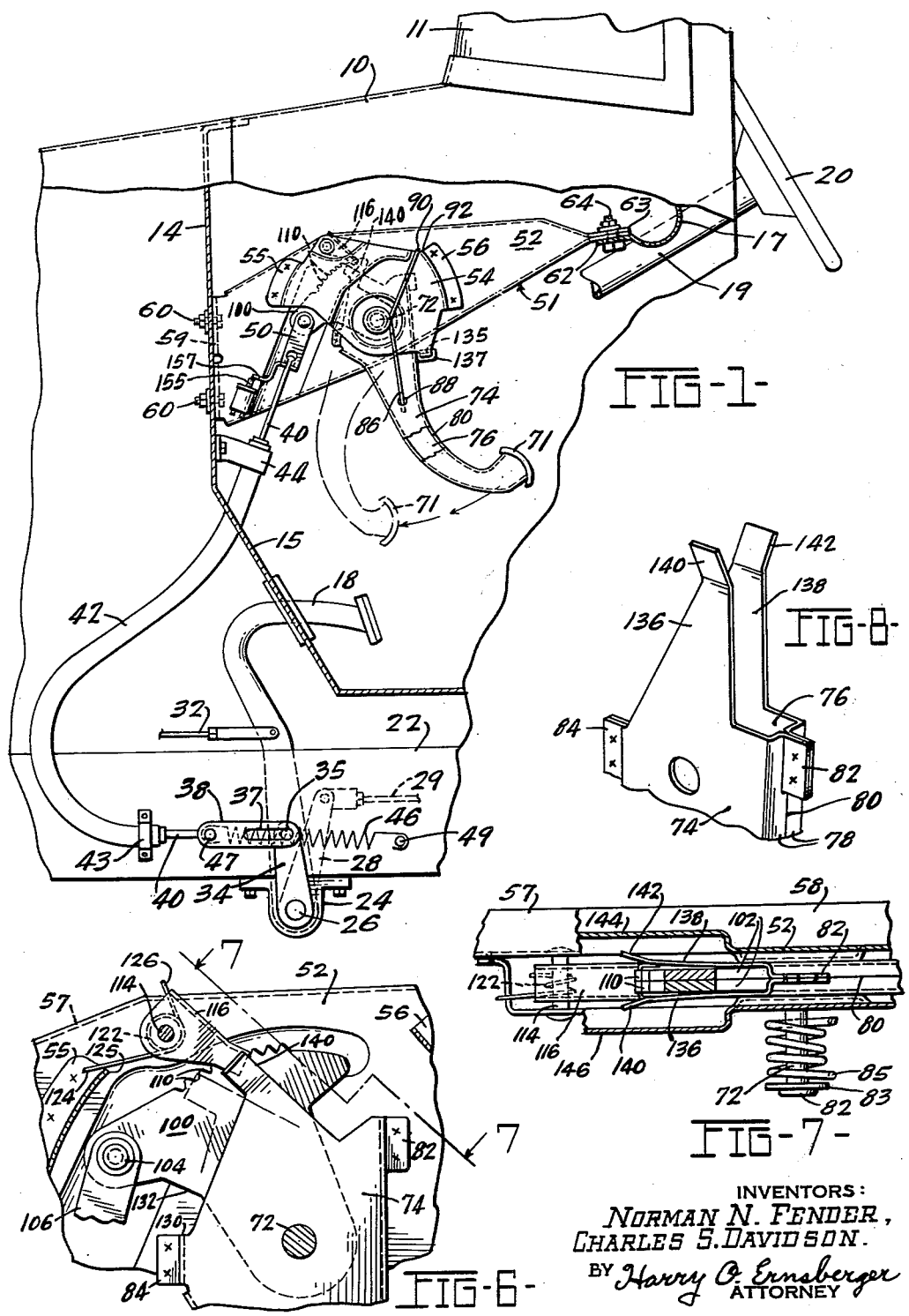

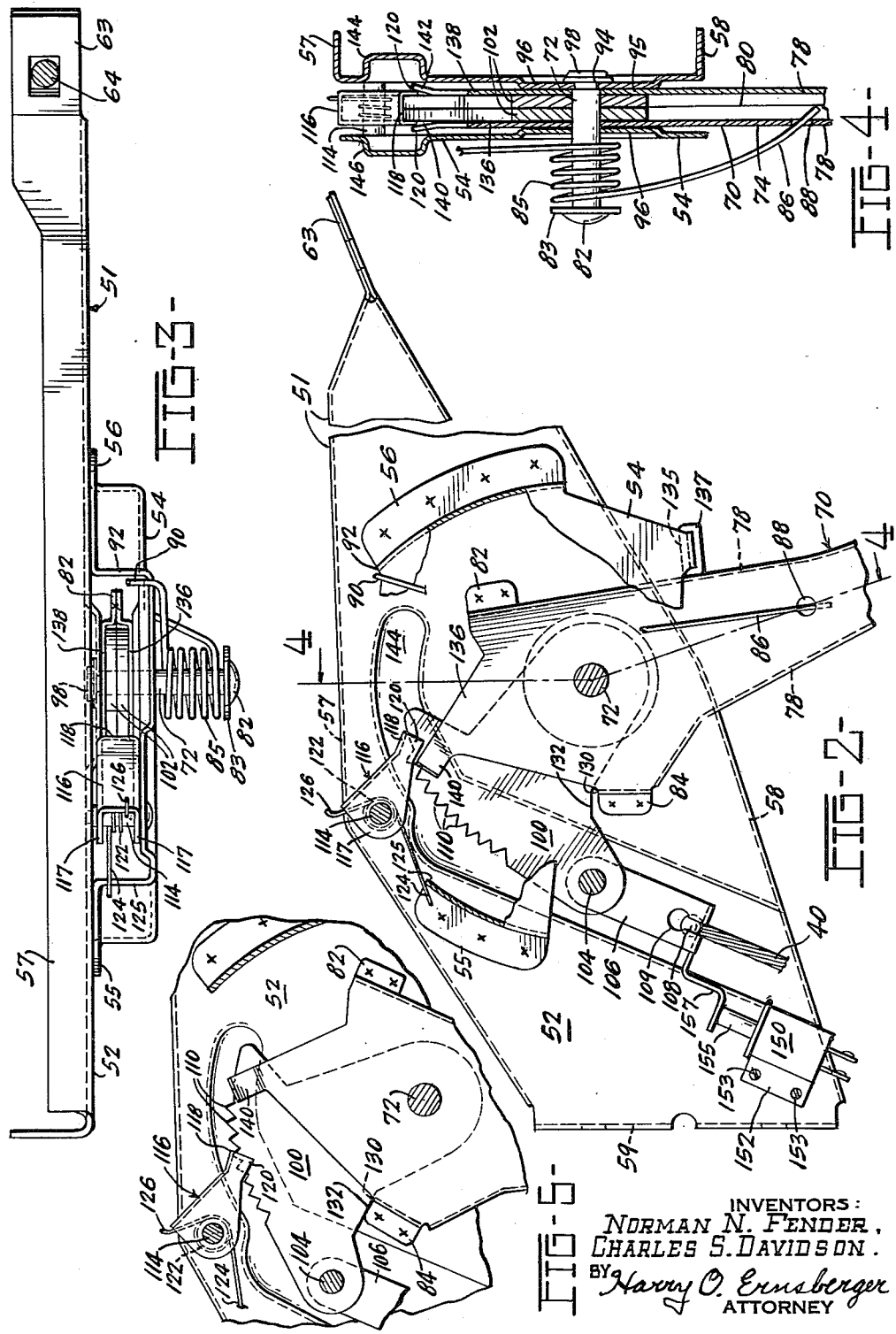

3,079,809
MECHANISM CONTROL
Norman N. Fender, Erie, and Charles S. Davidson, La Salle, Mich., assignors, by mesne assignments, to Universal American Corporation, Wilmington, Del., a corporation of Delaware
Filed Mar. 30, 1960, Ser. No. 18,738
5 Claims. (Cl. 74—542)

This invention relates to mechanism control and more particularly to a method of and apparatus for controlling the brake mechanism of vehicles and more especially the parking or emergency brakes of a vehicle.

Various types of brake actuating mechanisms of the foot-operated character have been utilized for actuating the parking brakes of automotive vehicles. In such foot-operated brake actuators which have been used, a foot-operated lever is associated with means whereby movement of the lever effects a setting of the parking brakes and a retaining means employed for holding the brakes in set position. In all such devices heretofore used, various forms of hand-operated and foot-operated means actuable independently of the brake actuating lever or member have been employed for effecting release of the brake retaining means to release the brakes.

Such member or lever releasing means as have been used embrace manually operable means independent of the foot-operated brake-setting lever in certain types of construction, and in other constructions a foot-operated member in addition to the brake-setting foot-operated lever has been employed to release the means holding the brakes in "set" positions. In certain types of foot-operated brake actuating mechanisms, the brake actuating foot-operated lever is retained in brake-setting position while in other types a member connected directly with the brakes and capable of movement independently of the foot-operated lever is actuated to brake-setting position and retained therein, the foot-operated lever being retracted to its initial or brake release position with the brake mechanism retained in a "set" position. In all such arrangements, means in addition to the foot-operated brake-setting actuator or lever have been utilized to effect a release of the retaining means holding the brakes in "set" positions.

The present invention embraces a novel method of effecting the setting and a release of the brakes by means of a single actuator or member arranged whereby successive movements of the actuator or member in one direction alternately effects a setting of the brakes and a release of the brakes.

An object of the invention resides in a method of controlling parking brakes of a vehicle involving the steps of moving an actuator to a position effecting a setting of the brakes of the vehicle, retaining the brakes in such position, retracting the actuator to its normal position, and subsequently moving the actuator in a brake-setting direction for effecting release of the brakes.

Another object of the invention is the provision of a control mechanism for the parking or emergency brakes of a vehicle wherein an actuating member moved through successive strokes in one direction alternately effects the setting and releasing of a means for retaining the brakes in set position.

Another object of the invention resides in a controlling means for the parking or emergency brakes of a vehicle including an actuator member and an actuated member associated with means for retaining the actuated member in adjusted or brake-setting positions to which it is moved by the actuator member whereby a first movement of the actuator member in one direction effects a brake-setting movement of the actuated member and a subsequent movement of the actuator member in the same direction effects a release of the actuated member.

Another object of the invention resides in a structural arrangement of actuator and actuated members whereby successive movements of the actuator member successively sets and releases the actuated member without the manipulation of any other components or mechanism whereby the number of parts or elements of the arrangement is reduced to a minimum.

Another object of the invention resides in a mechanism control wherein a relatively movable member is moved through operative strokes and released by successive movements in one direction of a single actuating member.

Another object of the invention resides in a mechanism control of this character embodying or associated with an indicator for indicating the condition of the mechanism adapted to be actuated.

Still another object of the invention is the provision of a vehicle parking brake controlling means embodying an actuator associated with means for retaining the brakes of a vehicle in a set position, the arrangement embodying abutment means movable with the actuator to engage and release the retaining means upon movement of the actuator in one direction and render ineffective to influence the retaining means upon movement of the acuator in the opposite direction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a portion of the operator's compartment of an automotive vehicle, portions of the vehicle body being broken away, illustrating a form of the brake actuating apparatus installed in a vehicle adapted to carry out the method of the invention;

FIGURE 2 is an elevational view of a portion of the arrangement illustrated in FIGURE 1, portions of the supporting means being broken away for purposes of illustration;

FIGURE 3 is a top plan view of the arrangement illustrated in FIGURE 2;

FIGURE 4 is a substantially vertical sectional view taken substantially on the line 4—4 of FIGURE 2;

FIGURE 5 is a view similar to FIGURE 2 illustrating components of the control mechanism in a position wherein the parking brake mechanism is in a set condition;

FIGURE 6 illustrates the relative positions of the components during return movement of the actuator to its initial position;

FIGURE 7 is a detail sectional view taken substantially on the line 7—7 of FIGURE 6, and FIGURE 8 is a fragmentary isometric view of a portion of the lever or actuator forming a component of the invention.

While the form of mechanism control illustrated in the drawings for carrying out the method of the invention is particularly adapted for actuating or controlling the emergency or parking brakes of a vehicle by foot-operation, it is to be understood that the principals of the invention may be employed for other mechanism control purposes wherever the same may be found to have utility.

Referring to the drawings in detail, there is illustrated in FIGURE 1 an installation of a form of the invention in the operator's compartment of a vehicle. The portion of the vehicle illustrated in FIGURE 1 is inclusive of a cowl section 10, a windshield 11, a dashboard or firewall 14, a toe board 15, an instrument panel 17, a service brake actuating pedal 18, a steering post 19 and a steering wheel 20.

The chassis of the vehicle supporting the body and the above-mentioned components is inclusive of a frame construction embodying a pair of lengthwise extending, transversely spaced frame members 22, one of which is shown in FIGURE 1, the frame members being joined by cross members (not shown). Secured to the frame members 22 are brackets 24, one of which is shown in FIGURE 1, which journally support a transversely extending operating shaft 26. Fixed on the shaft 26 is an arm 28 connected by a rod 29 or other suitable means with the parking brakes (not shown) associated with road wheels of the vehicle, the parking brakes being of conventional construction.

The service brake pedal 18, in the embodiment illustrated, is journaled upon the shaft 26, the pedal 18 being connected with a rod 32 arranged to actuate conventional hydraulic brake-setting mechanism for controlling the service brakes of the vehicle. Also fixed upon the shaft 26 is an arm 34 provided with a pin 35 at its distal end extending into a slot 37 formed in a link 38. A flexible cable or member 40 is connected with the link 38 and is enclosed within a suitable sheath 42. The cable 40 is connected with the brake actuating and controlling means of the invention for setting and releasing the parking or emergency brakes of the vehicle.

The lower end region of the sheath 42 is secured to one of the frame members 22 by means of a bracket 43, the upper end of the sheath being secured to the firewall 14 by means of a bracket 44.

The cable 40 and the link 38 are normally biased toward brake releasing position by means of a contractile spring 46, one end of which is connected to a pin 47 carried by the link 48, the other end of the spring being anchored to a pin 49 carried by one of the frame members 22. The conventional brake shoe springs (not shown) of the parking brake mechanism also exert a bias upon the flexible cable 40 toward brake release position.

The upper end of the flexible cable 40 is connected with a clevis 50 which is adapted to be moved and controlled by the mechanism control of the invention. The brake actuating and controlling mechanism of the invention is mounted upon a relatively stationary supporting means 51 which is inclusive of a support member, section or plate 52 to which is secured a supplemental support bracket or section 54. The body portion of bracket 54 is spaced from the member 52 and is formed with flange portions 55 and 56 which are welded to the support member 52.

The support member 52 is of generally planar shape having laterally extending flanges 57 and 58 at the upper and lower edges of the planar portion thereof. One end of the support member 52 is formed with a flange 59 secured to the firewall 14 by bolts 60, the other end region 63 of the support member provided by the converging flanges 57 and 58 is secured to a flange 62 formed on the instrument panel 17, bolts 64 extending through openings in the flange 62 and the end region 63 of the support bracket 52 to secure the support 51 in relatively fixed position in the vehicle operator's compartment.

The mechanism control of the invention in the embodiment illustrated is adapted to be foot-operated and is inclusive of a foot-operated actuator, lever or member 70 which is fulcrumed for pivotal movement upon a rod or shaft 72 extending through aligned openings in embossed portions 95 and 96 formed on the support member 52 and the support bracket section 54. The lever construction or actuator 70 is preferably formed of sheet metal and, in the embodiment illustrated, is formed of two mating sections 74 and 76, each provided with laterally extending flanges 78 which are assembled in abutting relation at a juncture line 80 and may be welded together at the juncture line 80.

Additionally the lever sections are provided with pairs of ears or projections 82 and 84 which are welded together as shown in FIGURE 8. The actuator or lever 70 is provided with a foot pad portion 71. The stub shaft 72, providing the fulcrum or pivotal support for the actuator or foot-operated lever member 70, is formed with a head 82 providing an abutment for a washer or disk 83. Disposed between the section or bracket 54 of the support means 51 and the disk 83 is a coil spring 85, one end region 86 of which extends through an opening 88 in the section 74 of the lever 70 and is anchored in the opening as shown in FIGURE 4.

The other end region 90 of the coil spring 85 engages an edge 92 of the bracket or support section 54 as shown in FIGURE 2, the spring 85 being tensioned in a direction to bias the actuator or lever 70 in a counterclockwise direction about its fulcrum 72 as viewed in FIGURE 2 toward its initial or brake release position.

The fulcrum pin or shaft 72 is provided with a tenon portion 94 which extends through an opening in the embossed portion 96 of the support member 52, the end of the fulcrum shaft 72 being swaged into a head formation 98 to secure the fulcrum shaft 72 to the support structure 51.

Disposed between the spaced apart sections 74 and 76 of the lever 70 is an actuated member or unit 100 which is arranged to be connected with the parking brakes. In the embodiment illustrated, the actuated member 100 comprises two identically shaped plate-like members 102 which may be of sector configuration and may be welded together if desired. The actuated unit 100 comprising the plates 102 is pivotally supported upon the fulcrum shaft 72 of the lever and is arranged for movement independently of the actuator or lever.

The actuated unit or sector 100 is provided with an opening receiving a clevis pin or rivet 104 which extends through openings in the leg portions of a clevis member 106 as shown in FIGURE 2. The clevis 106 is secured to the flexible brake actuating cable 40 to establish an operative connection between the actuated unit or sector 100 and the parking brake mechanism. The flexible cable 40 is equipped with a spherically-shaped member 108 which is adapted to be admitted through a circular opening 109 formed in one leg of the clevis 106 and engages the bight portion of the clevis to establish an interconnection between the cable 40 and the clevis 106.

Means is provided cooperating with the actuated unit 100 for retaining the unit 100 in brake-setting positions to which it is moved through operation of the lever 70 in a manner hereinafter described. The unit or sector 100 is formed with ratchet teeth 110 which are arranged in an arc or curved path generated about the axis of the fulcrum shaft 72 as a center. The teeth 110 are formed in both plates or sections 102 forming the unit 100 and are in transverse registration as shown in FIGURE 2.

While the unit or actuated member 100 may be formed of a single piece of metal, it has been found advantageous to form the unit 100 of two identically shaped plates 102 of comparatively thin metal as this enables the blanking of the sector shaped plates including the teeth 110 by conventional blanking operations without requiring further processing or smoothing of the teeth 110. Mounted in aligned openings in the planar portion of the support bracket 52 and the supplemental support section 54 is a pivot pin 114.

Disposed within the support section 54 is a channel shaped pawl 116, the parallel legs 117 of which are provided with openings to receive the pivot pin 114, the latter pivotally supporting the pawl 116. The edge region 118 of the bight portion of the channel shaped member and at the distal end forms a pawl tooth or detent portion adapted for cooperative engagement with the ratchet teeth 110 for retaining the actuated unit or brake operating unit 100 in brake-setting positions, one of such positions being shown in FIGURE 5.

It will be noted from FIGURES 2 and 5 that the parallel portions 120, being continuations of the side wall portions 117, of the pawl are comparatively short for a purpose hereinafter explained. Means is provided for normally biasing the pawl 116 in a clockwise direction about its pivot 114 as viewed in FIGURE 2 into cooperative relation with the teeth 110 on the sector unit 100. Surrounding the pin 114 is a coil spring 122 accommodated between the parallel leg portions 117 of the pawl.

One end region 124 of spring 122 is anchored in engagement with an edge 125 of the support bracket or section 54 as shown in FIGURES 2 and 3, the other end region 126 of the spring engaging against a rear portion of the pawl 116. The coil spring 122 is tensioned in a direction to urge or bias the tooth portion or abutment 118 of the pawl into cooperative relation with the teeth 110 of the unit 100.

The lever 70 and the actuated unit 100 are arranged and configured to establish an interengaging contact whereby the actuated unit 100 is moved to brake-setting position under certain conditions by movement of the lever 70 toward a brake-setting position, viz. in a clockwise direction about its fulcrum 72 as viewed in FIGURE 2. As shown in FIGURES 2 and 5, the ears or projections 84 of the lever sections 74 and 76 which are welded together and the edge regions 130 of the inwardly extending flanges 78 at the ears 84 form abutment means engageable with an edge region or surface 132 formed on the actuated unit 100.

It will be apparent from FIGURES 2 and 5, that foot pressure applied to the foot pad 71 on the lever 70 rotates the lever in a clockwise direction and, through the interengagement of the abutment provided by the tabs 84 and the edge regions 130 of the flanges on the lever with the surface 132 of the actuated unit 100, the unit is moved by the lever in a clockwise direction to effect a setting of the brakes through the medium of the clevis 106 and the cable 40 connected with the parking brake mechanism.

The support bracket 54 is provided with a laterally projecting ear portion 135, shown in FIGURE 2, upon which is mounted a tubular sleeve 137 of rubber or other yieldable material which when the lever is retracted to its initial or brake released position provides a yieldable buffer or abutment to absorb or cushion the impact of the lever under the bias or influence of the coil spring 85.

The arrangement of the invention in the embodiment illustrated embraces a method for releasing the actuated unit 100 to brake release position through movement of the actuator or lever member 70 in the same direction that it is moved in effecting a setting of the brakes through its actuation of the unit 100. As particularly shown in FIGURES 2, 4, 5 and 8 the side walls 74 and 76 of the sections comprising the lever 70 are formed with extensions 136 and 138 which terminate at their distal regions in flared or angularly arranged projections, abutments or ears 140 and 142.

The projections or abutments 140 and 142 formed on the lever 70 are disposed so that when the lever 70 is in its initial or brake release position, shown in FIGURE 2, the projections 140 and 142 are disposed adjacent but out of contact with the parallel leg or wall portions 120 of the walls 117 of the lever retaining detent or pawl 116. In operation, foot pressure applied to pad 71 moves the lever 70 from its initial position toward a brake-setting position viz. in a clockwise direction as viewed in FIGURE 2, the abutments or ears 140 and 142 engaging the walls 120 of the pawl 116, swinging the pawl in a counterclockwise direction about its pivot 114 until the projections 140 move past the leg portions 120 of the pawl.

During this movement, the abutment means provided by the tabs 84 and edges 130 of the lever flanges engage the edge surface 132 of actuated unit or sector 100 moving the same in a clockwise direction. The pawl 116, being biased into engagement with the teeth 110, engages a tooth of the sector and holds or retains the actuated member 100 in brake-setting position. Upon counterclockwise movement of the lever 70, as when the operator removes foot pressure from the pad 71, the spring 84 returns the lever 70 to its initial position shown in FIGURES 1 and 2.

During this retractive movement of the lever 70, the flared or angular projections 140 and 142 and the wall extension portions 136 and 138 of the lever engage the side wall portions 120 of the pawl 116 and are distorted or flexed outwardly by the side walls 120 of the pawl moving past the pawl without disengaging the pawl from teeth of the sector or unit 100 so that the sector is retained in brake-setting position. The lever 70 is returned to its initial or brake release position, shown in FIGURE 2, in engagement with the buffer or abutment 138 under the influence of spring 85.

The projections 140 and 142 on the lever are disposed in the position shown in FIGURE 2 adjacent the distal end region of the pawl 116 when the lever is retracted to its initial position. The actuated unit or sector 100 is held by the pawl 116 in a brake-setting position, while the lever 70 is returned under the influence of the spring 85 to its initial position whenever the operator relieves foot pressure from the pad 71.

When the operator desires to release the parking brake mechanism, foot pressure is again applied to the pad 71 and the lever 70 moved through a comparatively small distance in a brake-setting direction whereby the projections 140 and 142 abut and engage the side walls 120 of the pawl 116, lifting or swinging the pawl in a counterclockwise direction about its pivot 114 as viewed in FIGURES 2 and 5, to disengage the tooth portion 118 of the pawl from the teeth 110 of the sector or unit 100. The sector 100 is then returned, under the influence of the brake springs, to its initial or brake released position and the lever 70 is returned by the spring 85 to its initial position as viewed in FIGURE 2 when the operator again releases foot pressure from the foot pad 71.

As the projections 140 and 142, in the initial or brake release position of lever 70, are disposed adjacent the side walls 120 of the pawl, only a small rotative movement of the lever 70 about its fulcrum 72 is required to cause the projections to elevate the pawl 116 to effect release of the sector or actuated unit 100.

The upwardly extending wall portions 136 and 138 of the lever 70 and the projections 140 and 142 being of sheet metal have sufficient inherent flexibility or yieldability to facilitate slight outward distortion or movement of the projections 140 and 142 as they pass the side walls 120 of the pawl 116 upon return or retractive movement of the lever 70 to its initial position after the completion of a brake-setting stroke of the lever. During retractive movement of the lever, the projections 140 and 142 have no effect on the pawl 116 in its retention of the sector 100 in brake-setting condition.

FIGURES 6 and 7 illustrate the flared or outwardly distorted position of the projections 140 and 142 and the lever extensions 136 and 138 at the zone of their movement past the distal end region of the pawl 116 on the idle or return stroke of the foot-operated lever 70 to its initial position following its effective stroke in the opposite direction to effect a setting of the brake mechanism through movement of the sector 100.

As particularly shown in FIGURE 4, the main support 52 and the supplemental support bracket 54 are respectively formed with outwardly embossed portions 144 and 146 to accommodate the outward distortion or flexure of the projections 140 and 142 as the projections move past the leg portions 120 of the pawl 116. The arrangement of the invention is provided with signal means for indicating a brake-setting position of the actuated unit or sector 100.

As shown in FIGURE 2 a housing or casing 150 is secured to a plate 152 welded to the support 52 as indicated at 153. The housing 150 contains switch means actuated by lengthwise movement of a spring-biased plunger 155 to complete or interrupt a circuit through a signal lamp for visual signal means, or a circuit of an electrically energizable vibrator or buzzer if an audible means is desired to indicate that the sector 100 is in a brake-setting position or condition. A bracket 157 is secured to or formed on the clevis 106 and is arranged for engagement with the plunger 155 to effect lengthwise movement of the latter when the clevis approaches or moves away from a brake release position.

When the sector or unit 100 is moved to brake-setting position shown in FIGURE 5, the bracket 157 moves away from the plunger 155, which, under spring bias, engages switch contacts closing a circuit to activate a signal. The switch means contained within the housing 150 is preferably intercalated in the ignition circuit of the vehicle so that the switch in the housing 150 is effective to cause energization of the signal lamp or buzzer only when the ignition switch is in a circuit closing or "on" position with the sector 100 in brake-setting position.

It should be noted that one of the important aspects of the invention resides in a method and arrangement wherein successive strokes of an actuator, actuating member or lever in the same direction alternately effect a setting of the brake mechanism and a release of the brake mechanism without the movement of any other components or independent release means.

The principles of the invention embrace an arrangement of actuating and actuated means or members for effecting a setting of the parking brakes of a vehicle wherein the actuator or actuating member is returnable to its initial or brake release position without affecting or releasing the brake retaining means, but which, upon subsequent movement in an otherwise normal brake-setting direction, is effective to release the brake retaining means so that the actuated unit or member 120 is released for return to brake-setting position.

This novel result is accomplished through the provision of method and means whereby successive movements of the operating lever in one direction alternately effect a setting and release of the parking brake mechanism while movement of the operating lever in the other direction has no effect upon the lever retaining means.

The method and arrangement of the invention provides an inexpensive and compact parking brake actuator or control which comprises few components, eliminating all extraneous or additional members which have heretofore been required in order to attain a release of a brake retaining means.

The apparatus is reliable in its operation as a first movement of the lever or actuator, through its abutment contact with the actuated unit or sector 100, positively moves the sector 100 to a brake-setting position, and a subsequent movement of the actuator or lever 70 in the same direction positively engages and moves the lever retaining means or pawl 116 to a release position. Furthermore, the actuator or lever 70 is in an initial or brake release position whenever the operator releases foot pressure from the foot pad 71.

It is apparent that, within the scope of the invention, modifications and different arrangements may be made other than as herein disclosed, and the present disclosure is illustrative merely, the invention comprehending all variations thereof.

We claim:

1. Mechanism for controlling parking brakes of a vehicle including, in combination, a support, a foot operated lever pivotally mounted on the support, a sector member provided with ratchet teeth pivotally mounted on the support, a pawl member pivotally mounted on the support, said sector member being connected with the parking brakes, said pawl member being adapted for engagement with the teeth of the sector member for retaining the parking brakes in set position, abutment means on said foot operated lever engageable with the sector member whereby movement of the lever in a first direction moves the sector member to brake setting position, said lever being retractable to brake release position independently of said sector and pawl members, a spring normally biasing the foot operated lever toward retracted position, said foot operated lever being formed with an arm flexible in a lateral direction, said arm being arranged whereby during retracting movement of the lever the arm contacts the pawl member and is flexed laterally by the pawl member without affecting the relative position of the pawl member and whereby movement of the lever in said first direction engages the arm with the pawl member to disengage the same from the ratchet teeth to release the parking brakes.

2. Mechanism for controlling parking brakes of a vehicle including, in combination, a support, a foot operated lever fulcrumed on the support, a sector member provided with ratchet teeth pivotally mounted on the support, said sector member being connected with the vehicle parking brakes, a pawl pivotally mounted on the support and engageable with the ratchet teeth of said sector member for retaining said sector member in brake setting position, a first spring effective at all times to bias the pawl toward sector-engaging position, abutment means on said foot operated lever engageable with the sector member when the lever is moved in a first direction for actuating the sector member to brake setting position, a second spring engaging the lever and the support normally biasing the lever to retract the lever in the opposite direction independently of the sector member, and a flexible arm carried by the foot operated lever arranged to be engaged and flexed laterally by the pawl upon retractive movement of the lever without effecting the release of the pawl but engageable with the pawl upon subsequent movement of the foot operated lever in said first direction to engage and move the pawl away from the teeth of the sector member to thereby release the sector member to brake release position.

3. Mechanism for controlling the parking brakes of a vehicle including, in combination, a support, a foot operated lever fulcrumed on the support, a sector member formed with ratchet teeth pivoted for movement about the fulcrum of the foot operated lever and having operative connection with the vehicle parking brakes, a pawl pivotally mounted on the support and arranged for cooperation with the teeth on the sector for retaining the sector in brake setting position, abutment means on the lever engageable with the sector member whereby movement of the foot operated lever from an initial position moves the sector member to a brake setting position, a spring biasing said lever towards its initial position, said foot operated lever being provided with a pair of laterally flexible portions adapted to engage and be flexed laterally by the pawl during retractive movement of the lever toward its initial position to permit movement of the lever past the pawl without effecting disengagement of the pawl with the ratchet teeth, said laterally flexible portions being effective upon subsequent movement of the foot operated lever from its initial position to engage and move the pawl about its pivotal support out of contact with the teeth of the sector member to release the sector member for movement to brake release position.

4. Mechanism for controlling parking brakes of a vehicle including, in combination, a support, a foot operated lever pivotally mounted on the support, a sector member provided with ratchet teeth pivotally mounted on the support, a pawl member pivotally mounted on the support, said sector member arranged to be connected with the parking brakes, said pawl member being adapted for engagement with the teeth of the sector member for retaining the parking brakes in set position, abutment means on said foot operated lever engageable with the sector member whereby movement of the lever in a first direction effects movement of the sector member to brake setting position, said lever being retractable to brake release position independently of said sector and pawl members, resilient means normally biasing the foot operated lever toward retracted position, said foot operated lever being provided with a laterally yieldable wall portion adapted to be engaged and flexed laterally by the pawl during retractive movement of the foot operated lever to its initial position to permit movement of the lever past the pawl but effective upon subsequent movement of the lever from its retracted position to engage and move the pawl out of contact with the teeth of the sector member to release the sector member for movement to brake release position.

5. Mechanism for controlling parking brakes of a vehicle including, in combination, a support, a foot operated lever pivotally mounted on the support, a sector member provided with ratchet teeth pivotally mounted on the support, a pawl member pivotally mounted on the support, said sector member arranged to be connected with the parking brakes, said pawl member being adapted for engagement with the teeth of the sector member for retaining the parking brakes in set position, abutment means on said foot operated lever engageable with the sector member whereby movement of the lever in a first direction effects movement of the sector member to brake setting position, said lever being retractable to brake release position independently of said sector and pawl members, resilient means normally biasing the foot operated lever toward its retracted position, said foot operated lever being provided with laterally yieldable flared wall portions adapted to be engaged and flexed outwardly by the pawl during retractive movement of the foot operated lever to its initial position to permit movement of the lever past the pawl but effective upon subsequent movement of the lever from its retracted position to engage and move the pawl out of contact with the teeth of the sector member to release the sector member for movement to brake release position.

References Cited in the file of this patent

UNITED STATES PATENTS

| | | |
|---|---|---|
| 2,188,281 | Lucker | Jan. 23, 1940 |
| 2,281,467 | Thorp | Apr. 28, 1942 |
| 2,507,997 | Roedding et al. | May 16, 1950 |
| 2,905,024 | McCarthy et al. | Sept. 22, 1959 |
| 2,940,334 | Koskela | June 14, 1960 |
| 2,986,046 | Vigmostad | May 30, 1961 |
| 3,002,394 | Spisz | Oct. 3, 1961 |